United States Patent [19]

Gellert

[11] Patent Number: 4,917,593

[45] Date of Patent: Apr. 17, 1990

[54] INJECTION MOLDING SYSTEM HAVING VALVE MEMBER SPLIT RING

[76] Inventor: Jobst U. Gellert, 7A Prince Street, Georgetown, Ontario, Canada, L7G 2X1

[21] Appl. No.: 362,067

[22] Filed: Jun. 6, 1989

[30] Foreign Application Priority Data

Jun. 2, 1989 [CA] Canada ................................... 601623

[51] Int. Cl.$^4$ ........................................... B29C 45/23
[52] U.S. Cl. ................................. 425/549; 264/328.9; 264/328.15; 425/562; 425/564; 425/566
[58] Field of Search ...................... 264/328.9, 328.15; 425/549, 562, 563, 564, 566

[56] References Cited

U.S. PATENT DOCUMENTS

| 4,013,393 | 3/1977 | Gellert | 425/566 |
| 4,026,518 | 5/1977 | Gellert | 425/566 |
| 4,222,733 | 9/1980 | Gellert et al. | 425/566 |
| 4,712,995 | 12/1987 | Basnett | 425/562 |

Primary Examiner—Jay H. Woo
Assistant Examiner—Timothy W. Heitbrink
Attorney, Agent, or Firm—Riches, McKenzie & Herbert

[57] ABSTRACT

A valve gated injection molding apparatus in which the actuating force from a pivotal lever member is transmitted to an elongated valve member through a split ring. The two opposing segments of the split ring are mounted around the neck portion of the valve member when it is in the retracted position. The segments are received in a central opening in the manifold which keeps them in longitudinal engagement with the valve member as they reciprocate. The split ring has a notch which engages the inner end of the lever member. The split ring has a collar portion which extends into the nozzle bore in the forward position and determines the length of travel of the valve member between the open and closed positions.

9 Claims, 5 Drawing Sheets

INJECTION MOLDING SYSTEM HAVING VALVE MEMBER SPLIT RING

BACKGROUND OF THE INVENTION

This invention relates generally to injection molding and more particularly to a valve gated injection molding system in which a force in the closed direction is applied to the valve member through a Of course, valve gated injection molding systems having lever actuated valve members are well known in the art. Examples are described in applicant's U.S. Pat. Nos. 4,013,393 entitled "Valve-Gated Injection Molding Mechanism" which issued Mar. 22, 1977, 4,026,518 entitled "Bushing Seal for Valve-Gated Injection Mold", which issued May 31, 1977, 4,222,733 to Mold-Masters Limited entitled "Injection Molding Flow Control Mechanism" which issued Sept. 16, 1980, and 4,712,995 to Mold-Masters Limited entitled "Replaceable Rocker Arm Assembly for Injection Molding System" which issued Dec. 15, 1987. However, in all of these previous systems the valve member is driven to a forward closed position by the lever contacting the rear end of the valve member. While this has been satisfactory for many applications, it is not applicable to a rearwardly closed systems and is not suitable for the trend towards injection molding systems being more and more compact.

SUMMARY OF THE INVENTION

Accordingly, it is an object of the invention to at least partially overcome the disadvantages of the prior art by providing a split ring which is mounted around the valve member when it is in the retracted position to engage the lever.

To this end, in one of its aspects, the invention provides a valve gated hot runner injection molding system having a heated nozzle with a rear face which is secured against a heated manifold, the heated nozzle being received in a well in a cavity plate, the nozzle having a central bore extending therethrough to receive an elongated valve member with a forward end and a rear end and to provide a melt passage which extends in the central bore around at least a forward portion of the valve member to convey melt to a gate extending to a cavity, the elongated valve member projecting rearwardly into a central opening in the manifold which is in alignment with the central bore through the nozzle, the valve member being longitudinally reciprocable between a retracted position and a forward position, and pivotal lever means to apply a force to the valve member in a direction towards a closed position in which the forward end of the elongated valve member is seated in the gate, the improvement comprising a split ring which is mountable when the valve member is in the retracted position in the central opening in the manifold around a portion of the valve member which projects rearwardly from the nozzle, the split ring being received in the central opening in the manifold to retain the split ring in longitudinal engagement with the valve member while the split ring and the valve member reciprocate the split ring being engaged by the lever means to transmit the force towards the closed position to the valve member.

Further objects and advantages of the invention will appear from the following description taken together with the accompanying drawings.

Figure 1:
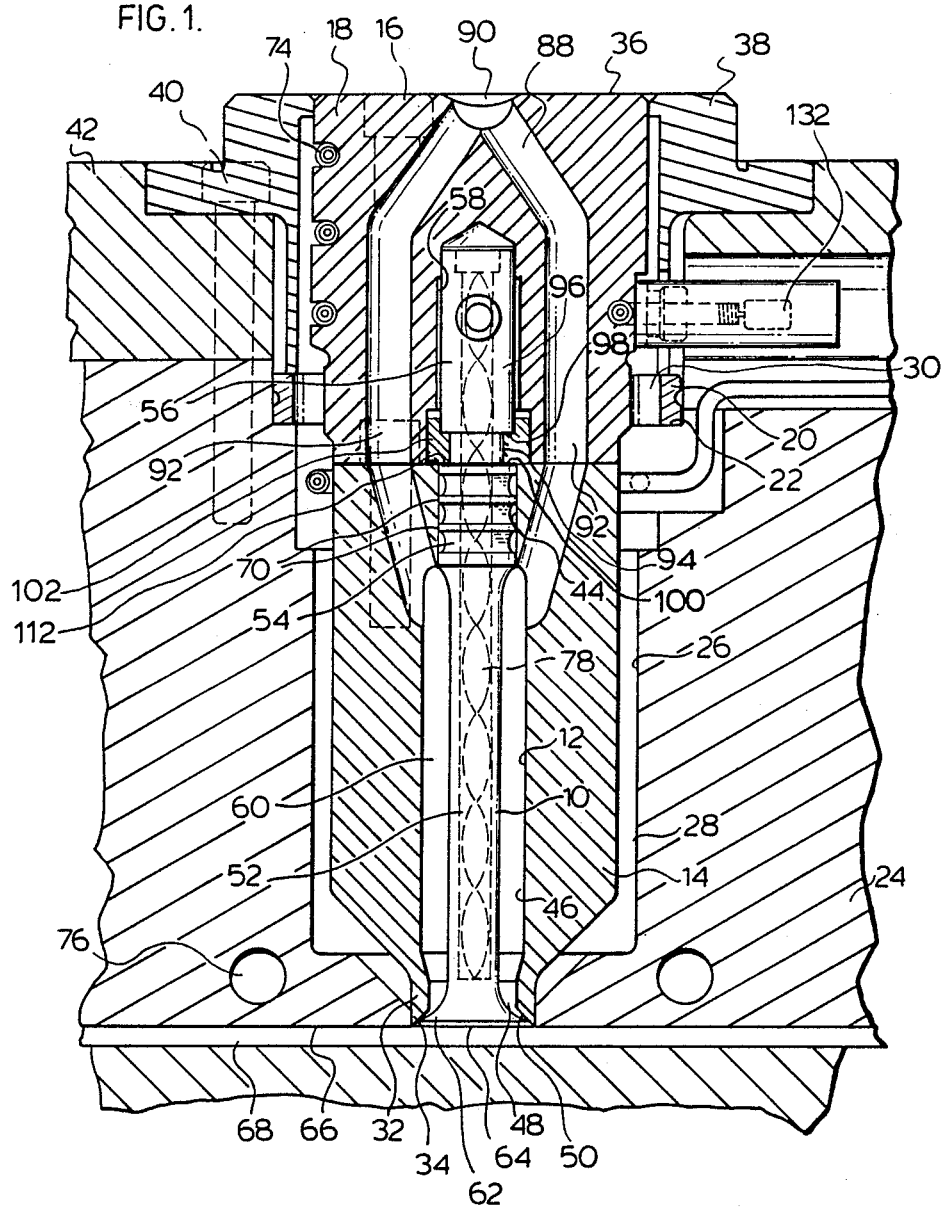
FIG. 1 is a sectional view of a portion of an injection molding system according to one embodiment of the invention.

Reference is first made to FIG. 1 which shows a valve member 10 which is received in a central bore 12 in a nozzle 14 which is secured by bolts 16 to a manifold 18. The manifold 18 has a locating flange 20 which is seated against a circumferential shoulder 22 of a cavity plate 24 to locate the nozzle 14 in a well 26 in the cavity plate 24 with an insulative air space 28 between the heated nozzle 14 and the cooled cavity plate 24. The locating flange 20 has openings 30 through it to reduce heat loss to the surrounding cavity plate 24. The nozzle 14 and manifold 18 are also located laterally by a forward nose portion 32 of the nozzle 14 being received in a matching cylindrical opening 34 through the cavity plate 24 and by the rear end 36 of the manifold 18 being received in a matching opening in a locating collar 38. The locating collar 38 is held securely in place by bolts 40 which extend through the back plate 42 into the cavity plate 24.

The central bore 12 through the nozzle 14 has a rear portion 44 and a larger diameter forward portion 46 which extends through the nose portion 32 of the nozzle to form a gate 48 with a forward mouth 50. The valve member 10 has a forward portion 52, a central portion 54 which extends through the rear portion 44 of the central bore 12, and a rear portion 56 which extends into a central opening 58 in the manifold 18. As can be seen, the forward portion 52 of the valve member 10 is smaller in diameter than the surrounding forward portion 46 of the central nozzle bore 12 which provides a melt flow space 60 between them, except that the forward portion 52 of the valve member has an enlarged forward end 62 which seats in the mouth 50 of the gate 48 in the retracted closed position. The enlarged end 62 of the valve member 10 has a flat forward face 64 which aligns with the same side 66 of the cavity 68 in the closed position. The central portion 54 of the valve member 10 has a number of spaced ridges 70 which fit in the rear portion 44 of the central nozzle bore 12 through the nozzle 14 to prevent leakage of pressurized melt around the reciprocating valve member 10.

Figure 2:
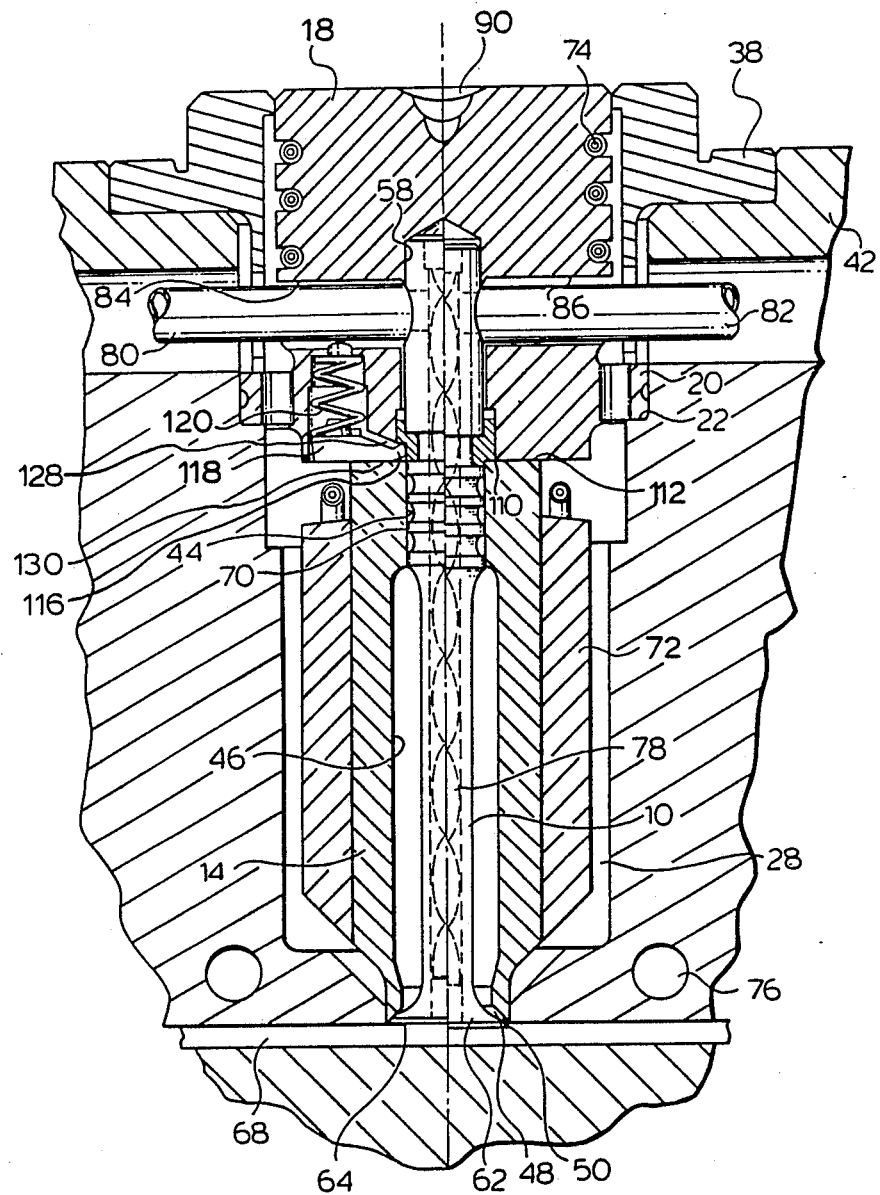
FIG. 2 is a split section view at a right angle to FIG. 1 showing the valve member in the open and closed positions.
Figure 3:
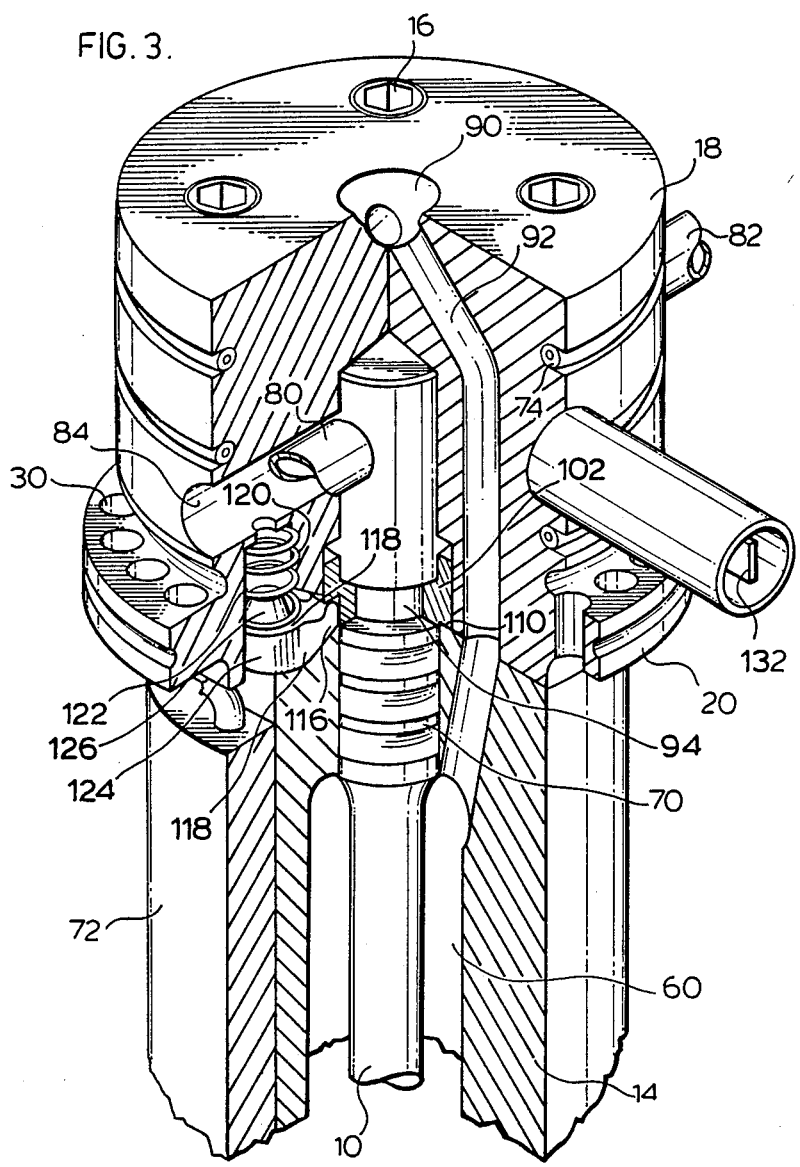
FIG. 3 is a cut-away isometric view showing the location of the split ring in more detail.

In this embodiment, the nozzle 14 is heated by plate heaters 72 which are secured in opposite sides as seen in FIG. 2. The manifold 18 is heated by an electrical heating element 74 which is integrally cast into it. The cavity plate 24 is cooled by pumping cooling water through cooling conduits 76. In this large volume application with the forward face 64 of the valve member extending to the cavity 68, it is desirable to provide more cooling to the enlarged end 62 of the valve member 10. Thus, a twisted partition 78 is mounted in the hollow valve member 10, and a circulation of cooling water is provided between inlet and outlet pipes 80,82 which extend laterally from the rear portion 56 of the valve member 10 through lateral openings 84,86 in the manifold 18. Thus, cooling water flows into the valve member 10 through the inlet pipe 80, forward along one side of the twisted partition 78 to the enlarged end 62 where it crosses over and flows rearwardly along the other side of the twisted partition and back out through outlet pipe 82. In an alternate embodiment of the cooling fluid flowing from the inlet pipe 80 to the outlet pipe 82 through the hollow valve member 10 can be air rather than water.

As seen in FIG. 1, a melt passage 88 extends to convey pressurized melt from a central inlet 90 at the rear end 36 of the manifold 18 to the gate 48. The passage 88 splits into two branches 92 which extend around the opening 58 in the manifold and join the space 60 around the forward portion 52 of the valve member 10. While the forward portion 52 of the valve member 10 is shown in this embodiment as being smaller in diameter than the central portion 54, this is not necessarily the case. The important thing is that the forward portion 46 of the central nozzle bore 12 must be sufficiently larger than the forward portion 52 of the valve member 10 to provide the space 60 with a sufficient cross-sectional area to convey the melt received through the split branches 92 of the melt passage 88. When the injection pressure of the melt forces the valve member 10 to the forward open position, the melt then flows through the gate 48 outwardly around the enlarged head 62 of the valve member 10 into the cavity 68.

The rear portion 56 of the valve member 10 which extends into the central opening 58 in the manifold 18 has a smaller diameter neck portion 94 which joins a rearward extending larger diameter portion 96 at a shoulder 98. In this embodiment of the invention, the neck portion 94 extends between this outwardly extending rearward shoulder 98 and an outwardly extending forward shoulder 100 where it joins the central portion 54 of the valve member 10. The valve member 10 is engaged longitudinally by a split ring 102 which is mounted around the neck portion 94 of the valve member 10 and reciprocally received in the central opening 58 in the manifold 18.

Figure 4:
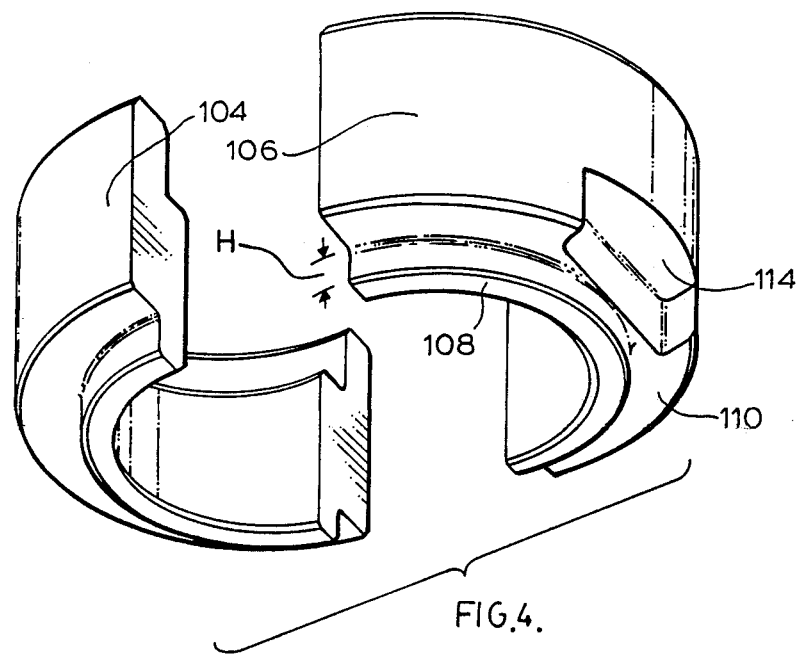
FIG. 4 is an isometric view of the split ring seen in FIGS. 1-3.

As clearly seen in FIG. 4, the split ring 102 has two opposing segments 104,106 which are mounted together around the valve member 10. The split ring 102 has a collar portion 108 which extends forwardly from a forwardly facing shoulder 110 into the central bore 12 of the nozzle 14 in the forward open position. The height "H" of this collar portion 108 determines the length of travel of the valve member 10 between the retracted closed position in which the enlarged forward end 62 of the valve member is seated in the mouth 50 of the gate 48 and the forward open position in which the forwardly facing shoulder 110 abuts against the rear face 112 of the nozzle 14. One of the segments 104,106 of the split ring 102 has a notch 114 to receive the inner end 116 of a pivotal lever member 118. In this embodiment of the invention, the lever member 118 is part of a biasing mechanism which applies a force through the split ring 102 to the valve member 10 in the rearward direction. The actuating mechanism includes a coiled compression spring 120 which is seated in a cylindrical opening 122 in the manifold 18. The lever member 118 has an outer end 124 with a locating tit 126 which receives the spring 120. The lever member 118 extends radially in a slot 128 in the manifold 18 and is shaped to provide a fulcrum 130 near the inner end 116 which abuts against the rear face 112 of the nozzle. The position of the fulcrum 130 provides a mechanical advantage to the force transmitted from the spring 120 to the valve member 10. Thus, the travel of the outer end 124 of the lever member 118 is considerably greater than that of the split ring 102 and valve member 10. While only a single biasing mechanism is shown in this embodiment, two or more biasing mechanism can be spaced around the valve member 10 to balance the lateral forces on the valve member.

In use, the system is assembled as shown by inserting the valve member 10 through the central bore 12 of the nozzle 14 and then mounting the two segments of the split ring 102 around the neck portion 94. As can be seen, there is just sufficient clearance to do this when the valve member 10 is in the retracted closed position. The spring 120 and lever member 118 are then mounted in position and the nozzle 14 is bolted to the manifold 18. Electrical power is applied to the plate heaters 72 and the terminal 132 of the heating element 74 to heat the nozzle 14 and manifold 18 to a predetermined operating temperature. Pressurized melt from a molding machine (not shown) is introduced into the melt passage 88 through the central inlet 90 according to a predetermined cycle. When injection pressure is applied, the force of the melt on the enlarged end 62 of the valve member 10 overcomes the force of the spring 120 and drives the valve member 10 forward until the forwardly facing shoulder 110 of the split ring 102 stops against the rear face 112 of the nozzle 14 in the open position. The melt then flows through the melt passage 88 and the gate 48 until the cavity 68 is filled. When the cavity 68 is full, the combination of the back pressure of the melt in the cavity 68 against the forward face 64 of the valve member and the force of the spring 120 drives the valve member 10 to the retracted closed position in which the enlarged forward end 62 is seated in the matching mouth 50 of the gate 48. The force from the spring 120 is applied by the inner end 116 of the lever member 118 to the split ring 102 which transmits it to the valve member 10 by bearing against the outwardly extending rearward shoulder 98. Receipt of the segments 104,106 of the split ring 102 in the central opening 58 in the manifold 18 holds them in place in engagement with the valve member 10 as they reciprocate between the open and closed positions. As mentioned above, the height "H" of the collar portion 108 which extends forwardly into the central bore 12 of the nozzle 14 in the open position determines the length of travel of the valve member 10 between the open and closed positions. The injection pressure is then released and after a short cooling period, the mold is opened to eject the molded products. After ejection the mold is closed and injection pressure is reapplied which reopens the gate 48. This cycle is repeated continuously with a frequency dependent upon the size of the cavity and the type of material being molded. As can be seen, the travel of the valve member 10 is relatively short, but large cavities can be filled quickly because of the large diameter of the enlarged end 62 of the valve member and the mouth 50 of the gate 48. The shape of the enlarged end 62 and the mouth causes the pressurized melt to flare outwardly as it enters the cavity 68. This produces a radial molecular orientation of the melt which is advantageous in increasing the strength of products having certain configurations.

Figure 6:
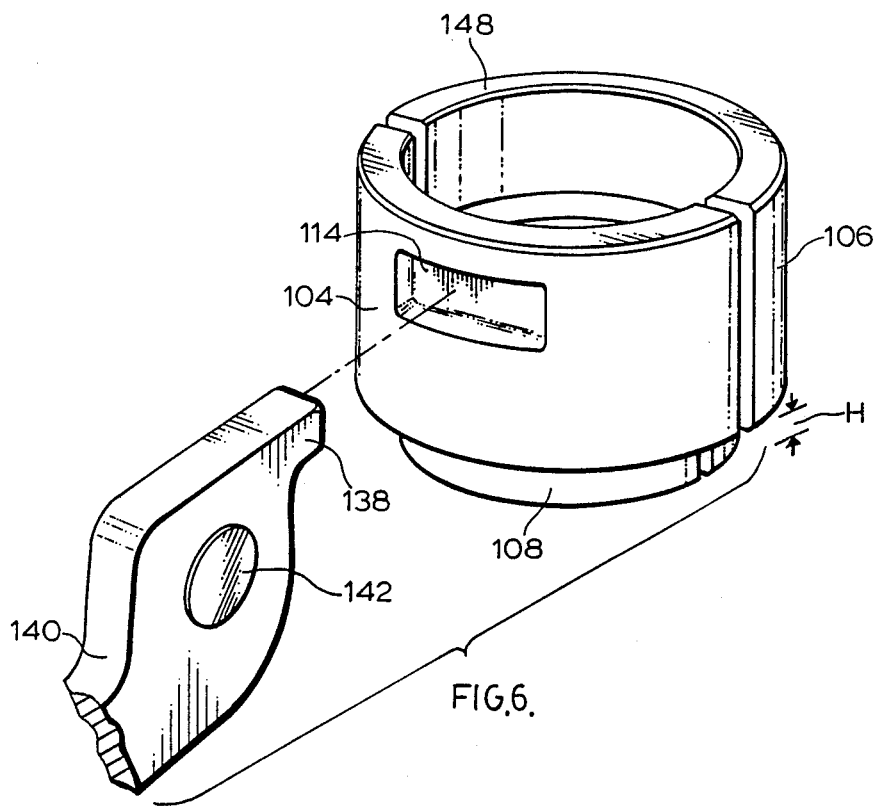
FIG. 6 is an isometric view of the split ring seen in FIG. 5.
Figure 5:
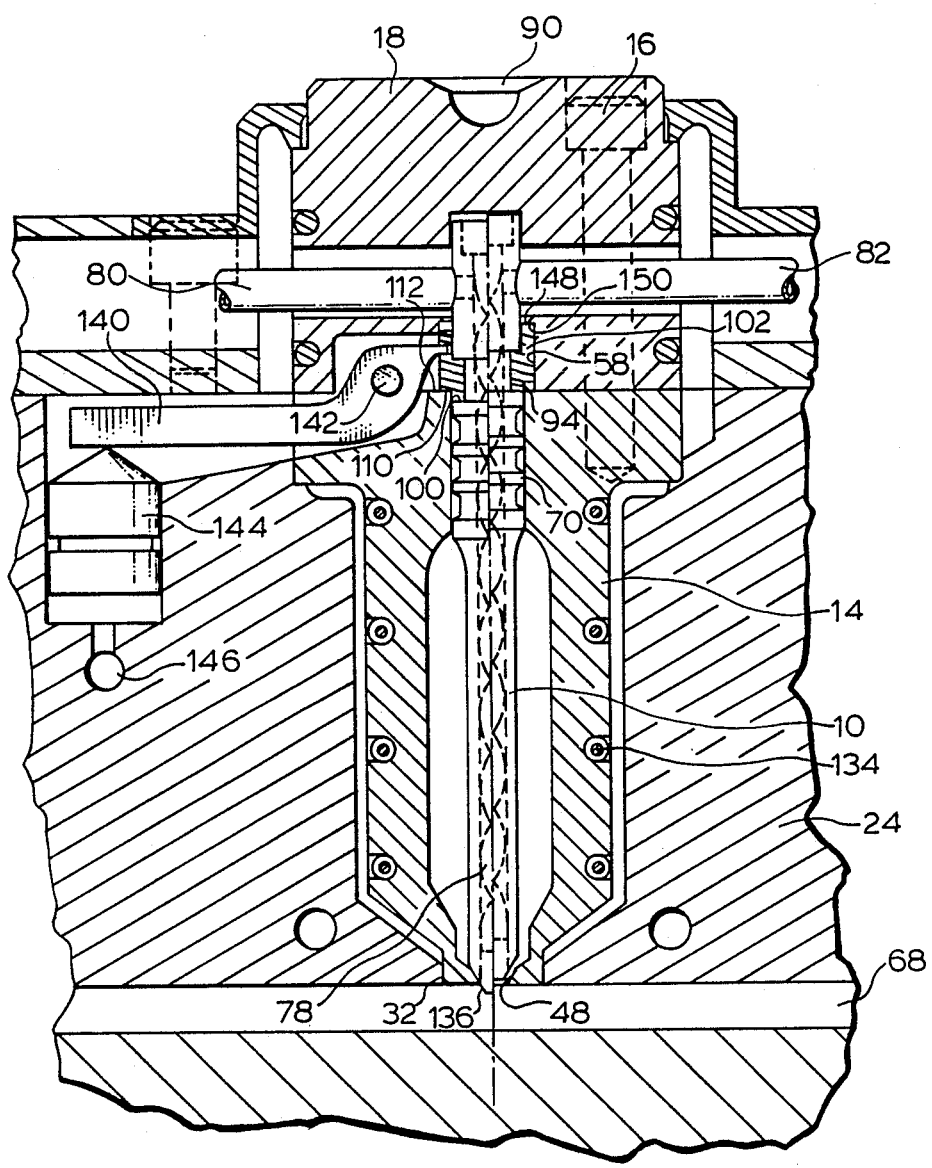
FIG. 5 is a sectional view of a portion of an injection molding system according to another embodiment of the invention.

FIG. 5 illustrates an injection molding system according to another embodiment of the invention. The elements of this embodiment which are common to the first embodiment described above are described and illustrated using the same reference numerals. In this case, the nozzle 14 has an integral helical heating element 134 and the nose portion 32 of the nozzle 14 forms a tapered gate 48 which receives the tip end 136 of the valve member 10 in the closed position. Thus, in this embodiment, the valve member retracts to the open position and is driven forwardly to the closed position rather than the reverse as described in regard to the first embodiment. The valve member 10 is similarly longitudinally engaged by a split ring 102 which is mounted around the neck portion 94 and reciprocated in the central opening 58 in the manifold 18. As seen in FIG. 6, the split ring 102 is the same as that described above, except that the notch 114 to receive the inner end 138 of the pivotal lever member 140 is in a different location. In this embodiment, the radially extending lever member 140 pivots around a pin 142 and is driven by a pneumatic piston 144 to which pressurized air is applied according to a controlled cycle through inlet duct 146.

In use, the system is assembled by mounting the two segments 104,106 of the split ring 102 around the neck portion 94 of the valve member 10 when it is in the retracted open position. The lever member 140 is then mounted in position and the nozzle 14 is bolted to the manifold 18. Pressurized melt is injected by the molding machine into the melt passage 88 and the pressure of the melt causes the valve member 10 to retract to the open position in which the rear face 148 of the split ring 102 abuts against an inwardly projecting shoulder 150 around the central opening 58 in the manifold 18. The pressurized melt flows through the melt passage 88 and the gate 48 until the cavity 68 is filled. When the cavity is full, pneumatic pressure is applied to the piston 144 which pivots the lever member 140 and drives the split ring 102 and the valve member 10 forwardly to the closed position. In this closed position, the tip end 136 of the valve member 10 is seated in the gate 48 and the forwardly facing shoulder 110 of the split ring 102 is stopped against the rear face 112 of the nozzle 14. The force from the pneumatic piston 144 is applied by the inner end 138 of the lever member 140 to the split ring 102 which transmits it to the valve member 10 by bearing against the outwardly extending forward shoulder 100. The segments 104,106 of the split ring 102 are retained in place in the central opening 58 in the manifold 18 as they reciprocate, and the length of travel of the valve member 10 between the open and closed positions is determined by the height "H" of the collar portion 108 of the split ring. The injection pressure is then released and after a short cooling period, the mold is opened for ejection. After ejection the mold is closed and injection pressure is reapplied which reopens the gate 48 and the cycle is repeated continuously.

While the description of the injection molding system with a split ring engaging the valve member has been given with respect to a preferred embodiment, it is not to be construed in a limiting sense. Variations and modifications will occur to those skilled in the art. For instance, the configuration of the split ring 102 and the valve member 10 can be altered to provide other arrangements of longitudinal engagement between them. Similarly, the split ring 102 can be otherwise engaged by the inner end of the lever member. Reference is made to the appended claims for a definition of the invention.

What I claim is:

1. In a valve gated hot runner injection molding apparatus having a heated nozzle with a rear face which is secured against a heated manifold, the heated nozzle being received in a well in a cavity plate, the nozzle having a central bore extending therethrough to receive an elongated valve member and to provide a melt passage which extends in the central bore around at least a forward portion of the valve member to convey melt to a gate extending to a cavity, the elongated valve member having a forward end and rear end, the valve member having a rearwardly projecting portion which extends into a central opening in the manifold, the central opening in the manifold being in alignment with the central bore through the nozzle, the valve member being longitudinally reciprocable between a retracted position and a forward position, and pivotal lever means to apply a force to the valve member in a direction towards a closed position in which the forward end of the elongated valve member is seated in the gate, the improvement comprising:

a split ring which is mountable when the valve member is in the retracted position in the central opening in the manifold around the rearwardly projecting portion of the valve member, the split ring and the rearwardly projecting portion of the valve member being received in the central opening in the manifold to retain the split ring in longitudinal engagement with the valve member while the split ring and the valve member reciprocate, the split ring being engaged by the lever means to transmit the force towards the closed position to the valve member.

2. An injection molding apparatus as claimed in claim 1 wherein the elongated valve member has a neck portion extending from a first outwardly extending shoulder in a direction away from the closed position, and the split ring has two separate opposing segments which fit around the neck portion of the valve member to abut against the first outwardly extending shoulder.

3. An injection molding apparatus as claimed in claim 2 wherein the neck portion of the elongated valve member extends between the first outwardly extending shoulder and a second outwardly extending shoulder.

4. An injection molding apparatus as claimed in claim 3 wherein one of the segments of the split ring has a notch to engageably receive an inner end of the lever means.

5. An injection molding apparatus as claimed in claim 4 where the valve member closes in the retracted position and the split ring has a forward facing shoulder which is larger in diameter than the central bore through the nozzle, whereby the forward facing shoulder abuts against the rear face of the nozzle in the forward open position.

6. An injection molding apparatus as claimed in claim 4 wherein the split ring has a collar portion which extends forwardly from the forward facing shoulder into the central bore through nozzle in the forward open position, the collar portion having a predetermined height which determines the length of travel of the valve member between the forward open position and the retracted closed position.

7. An injection molding apparatus as claimed in claim 6 wherein the pivotal lever means is engaged by biasing means mounted on the manifold to apply a force through the lever means and the split ring to the valve member in the rearward direction.

8. An injection molding apparatus as claimed in claim 4 wherein the valve member closes in the forward position and the split ring has a rear face which abuts against an inwardly projecting shoulder around the central opening in the manifold in the retracted open position.

9. An injection molding apparatus as claimed in claim 8 where the lever means is engaged by piston driven actuating means to apply a controlled force through the lever means and the split ring to the valve member in the forward direction.

* * * * *